United States Patent
Juels et al.

(10) Patent No.: US 8,381,062 B1
(45) Date of Patent: Feb. 19, 2013

(54) PROOF OF RETRIEVABILITY FOR ARCHIVED FILES

(75) Inventors: Ari Juels, Brookline, MA (US); Burton S. Kaliski, Jr., Wellesley, MA (US); Kevin D. Bowers, Medford, MA (US); Alina M. Oprea, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 1211 days.

(21) Appl. No.: 12/115,145

(22) Filed: May 5, 2008

Related U.S. Application Data

(60) Provisional application No. 60/915,788, filed on May 3, 2007, provisional application No. 60/954,228, filed on Aug. 6, 2007.

(51) Int. Cl.
    *G06F 11/00* (2006.01)
(52) U.S. Cl. .......................................... 714/752; 726/26
(58) Field of Classification Search .................. 714/752; 713/171; 726/26
    See application file for complete search history.

(56) References Cited

U.S. PATENT DOCUMENTS

| | | | | |
|---|---|---|---|---|
| 5,488,702 | A * | 1/1996 | Byers et al. ...................... | 726/26 |
| 6,138,237 | A * | 10/2000 | Ruben et al. ..................... | 726/21 |
| 6,795,946 | B1 * | 9/2004 | Drummond-Murray et al. .............................. | 714/758 |
| 7,543,147 | B2 * | 6/2009 | Benantar et al. .............. | 713/175 |
| 7,602,904 | B2 * | 10/2009 | Juels et al. ....................... | 380/28 |
| 7,757,099 | B2 * | 7/2010 | Greco et al. ................... | 713/193 |
| 8,132,073 | B1 * | 3/2012 | Bowers et al. ................ | 714/755 |
| 2002/0087814 | A1 * | 7/2002 | Ripley et al. ................... | 711/154 |
| 2005/0114296 | A1 * | 5/2005 | Farber et al. ..................... | 707/1 |
| 2006/0136728 | A1 * | 6/2006 | Gentry et al. .................. | 713/176 |
| 2008/0065906 | A1 * | 3/2008 | Itagaki et al. ................. | 713/193 |
| 2012/0221897 | A1 * | 8/2012 | Richter ........................... | 714/37 |

\* cited by examiner

*Primary Examiner* — Scott Baderman
*Assistant Examiner* — Elmira Mehrmanesh
(74) *Attorney, Agent, or Firm* — Krishnendu Gupta; Gerald P. Kazanjian

(57) ABSTRACT

A proof of retrievability (POR) mechanism is applicable to a file for providing assurances of file possession to a requesting client by transmitting only a portion of the entire file. The client compares or examines validation values returned from predetermined validation segments of the file with previously computed validation attributes for assessing the existence of the file. Since the archive server does not have access to the validation function prior to the request, or challenge, from the client, the archive server cannot anticipate the validation values expected from the validation function. Further, since the validation segments from which the validation attributes, and hence the validation values were derived, are also unknown to the server, the server cannot anticipate which portions of the file will be employed for validation.

19 Claims, 9 Drawing Sheets

PROOF OF RETRIEVABILITY FOR ARCHIVED FILES

RELATED APPLICATIONS

The patent application claims the benefit under 35 U.S.C. 119(e) of U.S. Provisional Patent Application No. 60/915,788, filed May 3, 2007, entitled "PORs: PROOFS OF RETRIEVABILITY FOR LARGE FILES", and U.S. Provisional Patent Application No. 60/954,228, filed Aug. 6, 2007, entitled "PORs: PROOFS OF RETRIEVABILITY FOR LARGE FILES", both incorporated herein by reference.

BACKGROUND

In a managed information environment, such as a networked computer infrastructure, cryptographic techniques have been employed for transforming data in a manner indiscernible to an unauthorized interceptor, but efficiently renderable to an intended recipient. Such techniques typically rely on a so-called one-way function, for which computation in the forward direction is relatively, straightforward, but reverse computation based on applying an inverse function are computationally infeasible. One-way functions are typically facilitated by the use of a key that is known to the authorized parties to the message, without which the corresponding inverse function requires substantial computational resources to compute. Early cryptographic techniques, due to the computationally intensive operations required, were typically reserved for encryption and authentication of highly sensitive communications, but modern advances in computational abilities coupled with increased awareness of a need to protect electronically transmitted information have made such cryptographic techniques commonplace.

These and other trends are opening up computing systems to new forms of outsourcing, that is, delegation of computing services to outside entities. Improving network bandwidth and reliability are reducing user reliance on local resources. Energy and labor costs as well as computing system complexity are militating toward the centralized administration of hardware. Increasingly, users employ software and data that resides thousands of miles away on machines and that they themselves do not own. Grid computing, the harnessing of disparate machines into a unified computing platform, has played a role in scientific computing for some years. Similarly, software as a service (SaaS)—loosely a throwback to terminal/mainframe computing architectures—is now a pillar in the Internet-technology strategies of major companies.

Storage is no exception to the outsourcing trend. Online data-backup services abound for consumers and enterprises alike. Amazon® Simple Storage Service, for example, offers an abstracted online-storage interface, allowing programmers to access data objects through web service calls, with fees metered in gigabyte-months and data transfer amounts. Researchers have investigated alternative service models, such as peer-to-peer data archiving, as an emerging trend.

SUMMARY

As archived storage for electronic data evolves, such storage tends to become more like a commodity. Contractual obligations to provide archive services become delegated according to a supply chain. As the actual archivers of sensitive data become more attenuated from the clients for whom the archived data belongs, and since it is quite likely that archives may never be invoked, a breakdown in the archive chain may not be realized until the data is called upon, at which point irrecoverable losses may have occurred. Service contracts covering archive services may specify a duration or resilience in the archive process, but with an ever increasing volume of electronic data generated by modern business practices, it can be problematic to inventory or assess the resiliency of archived data.

Conventional archive and recovery mechanisms store a file and either recall an entire file to verify existence or simply assume the file is intact. Accordingly, conventional archive and recovery systems suffer from the shortcoming that corruption or other inability to accurately retrieve the file may not be detectable until the failed recovery attempt. Periodic conventional validation of file existence requires retrieval of the entire file. As the number and size of archived files increases, it becomes inefficient, if not infeasible, to recall each entire archived file to verify the existence thereof. It would be beneficial for an archiving entity to be able to provide assurances of file possession, and hence recoverability, without having to present the entire file, and further that the requestor of the archived file can validate the assurances in a manner that cannot be falsely generated by the archiver.

A more recent application of the cryptographic techniques mentioned above involves so-called "proof of retrievability" for archived electronic media, typically file backups, or archives. Traditional backups of computer generated information entailed nothing more than an individual user copying files onto a floppy disk, or a system operations manager systematically downloading magtapes of company files stored on disk drives in a machine room, and storing the magtapes in an adjacent closet or safe. Modern proliferation of electronically generated and transported data, however, along with services associated with such information, have defined a business niche of archive services for providing backup storage, typically in a transparent manner via remote connections, rather than the conventional collection of magtapes.

As users and enterprises come to rely on diverse sets of data repositories, with variability in service guarantees and underlying hardware integrity, they will require new forms of assurance of the integrity and accessibility of their data. Simple replication offers one avenue to higher-assurance data archiving, but at often unnecessarily and unsustainably high expense. (Indeed, a recent IDC report suggests that data generation is outpacing storage availability) Protocols such as a so-called data-dispersion scheme (Rabin) are more efficient: They share data across multiple repositories with minimum redundancy, and ensure the availability of the data given the integrity of a quorum (k-out-of-n) of repositories. Such protocols, however, do not provide assurances about the state of individual repositories—a shortcoming that limits the assurance the protocols can provide to relying parties.

Configurations disclosed below present a cryptographic building block known as a proof of retrievability (POR). A POR enables a user (verifier) to determine that an archive (prover) "possesses" a file or data object F. More precisely, a successfully executed POR assures a verifier that the prover presents a protocol interface through which the verifier can retrieve F in its entirety. Of course, a prover can refuse to release F even after successfully participating in a POR. A POR, however, provides strong assurances of file retrievability barring changes in prover behavior.

Accordingly, configurations herein substantially overcome the shortcomings of conventional archive and recovery mechanisms by a proof of retrievability (POR) applicable to a file for providing assurances of file possession to a requesting client by transmitting only a portion of the entire file. A function interface to an archive server allows the archive server to perform a validation function, provided by the client, on predetermined portions of the archived file. The client compares or examines validation values returned from predetermined validation segments of the file with previously computed validation attributes for assessing the existence (i.e. recoverability) of the file on the archive server. Since the archive server does not have access to the validation function prior to the request, or challenge, from the client, the archive server cannot anticipate the validation values expected from the validation function. Further, since the validation segments from which the validation attributes, and hence the validation values were derived, are also unknown to the server, the server cannot anticipate which portions of the file will be employed for validation. The validation function is typically enabled from the client in the form of a key provided to the archive server by the client, minimizing the extent of the transaction required to invoke the function interface at the archive server (server, or prover).

A POR scheme as disclosed herein enables an archive or back-up service (prover) to produce a concise proof that a user (verifier) can retrieve a target file F, that is, that the archive retains and reliably transmits file data sufficient for the user to recover F in its entirety. A proof of retrievability (POR) therefore provides assurances that an archiving entity to whom a file is entrusted will be able to produce the archived file if called upon to do so. A POR may be viewed as a kind of cryptographic proof of knowledge (POK), but one specially designed to handle a large file (or bitstring) F. Configurations herein define POR protocols in which the communication costs, number of memory accesses for the prover, and storage requirements of the user (verifier) are small parameters essentially independent of the length of F. In a POR, unlike a POK, neither the prover nor the verifier need actually have knowledge of F. PORs therefore, give rise to a beneficial security definition.

PORs are an important tool for semi-trusted online archives. Existing cryptographic techniques help users ensure the privacy and integrity of files they retrieve. It is also natural, however, for users to want to verify that archivers do not delete or modify files prior to retrieval. The goal of a POR is to accomplish these checks without users having to download the files themselves. A POR can also provide quality-of-service guarantees, i.e., show that a file is retrievable within a certain time bound.

In the event of file corruption, or other indication of an inability to retrieve the file resulting from the POR, error correcting code (ECC) techniques are employed to recover a file. The method generates error correction codes for withstanding at least a degree of file corruption beyond which corruption is assured to be detectable from the POR operation. In other words, the state of a file is verifiable to be either uncorrupted within a range for which the undetectable corruption is recoverable by the ECC codes, or else such unrecoverable corruption detected, such that the true state of the file is ascertainable, enabling mitigating action rather than leaving unrecoverable corruption undetected. For example, if a POR is applied that detects greater than 10% corruption, and an ECC is employed which covers up to 10% corruption, then either the POR may be guaranteed to assure file recoverability because any undetected corruption (less than 10%) will be accommodated by the ECC.

The ECC processing also avoids false assurances of file recoverability by encrypting and permuting the error correction portions of the file. Identification of portions of a file over which the ECCs are computed allows spoofing by a file adversary that can compromise the ECC recovery. Encrypting the file causes ECC portions and non ECC portions to be indistinguishable. Permutation applies an ordering or interleaving to a file which cannot be easily interpreted, thus preventing an association between ECC codes and the corresponding file portions. In contrast, conventional archive storage suffers from the shortcoming that it is difficult to verify the existence or recoverability of stored files, and failure of the recovery may not be determined until a failed recovery attempt, at which time irrecoverable loss may have occurred.

The further disclosed application of the ECC framework complements the assurances of the POR. The PORs employed as examples herein operate generally as follows: The client applies an error-correcting code ECCout to the target file F to obtain an encoded (expanded) file $\tilde{F}$, which it stores with the server. The code ECCout has the effect of rendering F recoverable even if up to some $\epsilon$-fraction of $\tilde{F}$ is corrupted, where $\epsilon$ is a parameter dependent on the choice of ECCout.

To rule out high file-corruption rates and thus ensure that F is retrievable, the client randomly samples $\tilde{F}$. It does so by challenging the server. The client specifies a subset s of blocks in $\tilde{F}$ plus a nonce u (whose purpose is discussed below). The server applies a function respond to s and returns the result respond (s, u). With sufficient challenge rounds, the client obtains the following two-sided guarantee:

1. If the server corrupts more than an $\epsilon$-fraction of $\tilde{F}$, and F is therefore unretrievable, the client will detect this condition with high probability;

2. If the server corrupts less than (or exactly) an $\epsilon$-fraction of $\tilde{F}$, the client is able to retrieve F in its entirety via decoding under ECCout. By analogy with zero-knowledge proofs, the same interface used for challenge-response interactions between the client and server is also available for extraction. The client first attempts to download F as normal (checking the integrity of the file against a MAC or digital signature). If this usual process fails, then the client resorts to a POR-based extraction. The client in this case submits challenges to the server and reconstructs F from the (partially corrupted) values yielded by server via respond.

To illustrate the basic idea and operation of a POR, it is worth considering a straightforward design involving a keyed hash function h(k(F)). In this scheme, prior to archiving a file F, the verifier computes and stores a hash value r=h(k(F)) along with secret, random key k. To check that the prover possesses F, the verifier releases k and asks the prover to compute and return r. Provided that h is resistant to second-preimage attacks, this simple protocol provides a strong proof that the prover knows F. By storing multiple hash values over different keys, the verifier can initiate multiple, independent checks. This keyed-hash approach, however, may impose high resource costs. The keyed-hash protocol operates on the notion that the verifier store a number of hash values linear in the number of checks it is to perform. This characteristic conflicts with the aim of enabling the verifier to offload its storage burden. More significantly, each protocol invocation requires that the prover process the entire file F. For large F, even a computationally lightweight operation like hashing can be highly burdensome. Furthermore, it requires that the prover read the entire file for every proof—a significant overhead for an archive whose intended load is only an occasional read per file, were every file to be tested frequently.

In conventional POR constructions, the function respond returns a single file block or an XOR of file blocks. However, configurations here substantially overcome above described shortcomings of file corruption detection in that the respond may itself apply an arbitrary error correcting code. In particular, configurations below consider schemes in which respond computes a codeword on the blocks in s and returns the uth symbol. Configurations employ such an arrangement as the inner code as ECCin and to the code ECCout as the outer code.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The example configuration below discloses a POR protocol in which the verifier need store only one or more cryptographic keys—irrespective of the size and number of the files whose retrievability it seeks to verify—as well as a small amount of dynamic state (some tens of bits) for each file. More strikingly, and somewhat counterintuitively, the disclosed scheme requires that the prover access only a small portion of a (large) file F in the course of a POR. In fact, the portion of F "touched" by the prover is essentially independent of the length of F and would, in a typical parameterization, include just hundreds or thousands of data blocks.

Briefly, the disclosed POR protocol encrypts F and randomly embeds a set of randomly-valued check blocks called sentinels. The use of encryption here renders the sentinels indistinguishable from other file blocks. Alternatively, portions of the file itself may be encrypted to generate the check blocks (values), discussed below. The verifier challenges the prover by specifying the positions of a collection of sentinels and asking the prover to return the associated sentinel values. If the prover has modified or deleted a substantial portion of F, then with high probability it will also have suppressed a number of sentinels. It is therefore unlikely to respond correctly to the verifier. To protect against corruption by the prover of a small portion of F, the disclosed recovery approach also employs error-correcting codes.

Alternatively, schemes based on the use of message-authentication codes (MACs) applied to (selected) file blocks may be employed for generating the validation segments. The principle is much the same as in the sentinel based scheme. The verifier performs spot-checks on elements of ~F. Error-coding ensures that if a sizeable fraction of ~F is uncorrupted and available, as demonstrated by spot-checks, then the verifier can recover F with high probability.

Figure 1:
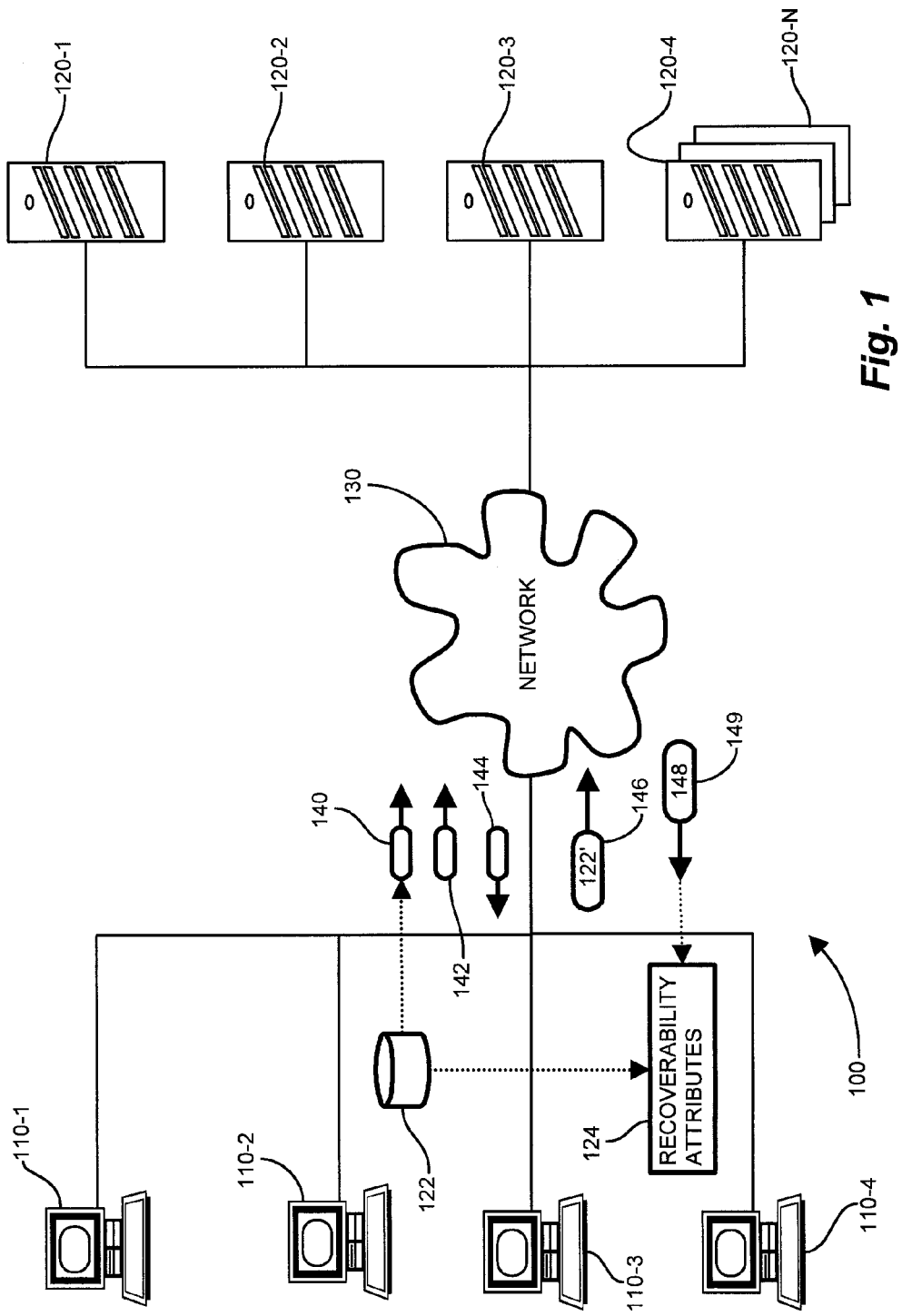
FIG. 1 shows a context diagram of an archive storage environment suitable for use with configurations disclosed herein.

FIG. 1 shows a context diagram of an archive storage environment suitable for use with configurations disclosed herein. Referring to FIG. 1, an archive storage environment 100 includes a plurality of users 110-1 . . . 110-4 (110 generally) invoking a set of archive servers 120-1 . . . 120-N (120 generally). Each of the archive servers 120 is operable for mass storage of data from the users 110, usually via a contractual or service arrangement. A network 130 interconnects the users 110, also known as clients, and archive servers (servers) for providing remote storage invocation to transport the archived data between the users 110 and the servers 120. A typical exchange includes an archive request 140, in which a user 110 sends a data item such as a file 122 to the archive server 120 for storage. At a subsequent time, the user issues a request 142 for the file, to which the server 120 responds with the recovered file 144.

In an environment as in FIG. 1, the general exchange for proof of recoverability is as follows: an authenticator transforms a raw file F into an encoded file ~F 122 to be stored with the prover/archive 120. A key generation algorithm produces a key k in stored by the verifier and used in encoding (The key k may be independent of F). The verifier performs a challenge-response protocol with the prover to check that the verifier can retrieve F. In a typical environment 100, there are many users 110 each sending a multitude of files 122 to the servers 120. In the configurations discussed below, at some time prior to an archive request 142, a user 110 may desire to verify existence of the file on the server 120, for the reasons discussed above. Accordingly, the user issues a challenge 146 for the file 122 including a file identifier 122' to the server 120, to which the server 120 responds with a validation value 148 as a response 149 to the challenge 146. The user 110 compares the validation value 148 with a recoverability attribute 124 corresponding to the file 122 which was sent to the archive server 120. The recoverability attribute 124, discussed further below, is a value or set of values based on the data in the file 122 and which is computationally infeasible to produce accurately without actual possession of the file 122. Therefore, the user 120 performs a check, such as a comparison, match, or other functional or equivalence comparison, between the returned validation value 148 and the previously computed recoverability attributes 124 to confirm possession of the file 122 by the server 120 and hence, the ability to reproduce or recover the file upon a later request 142

Figure 2:
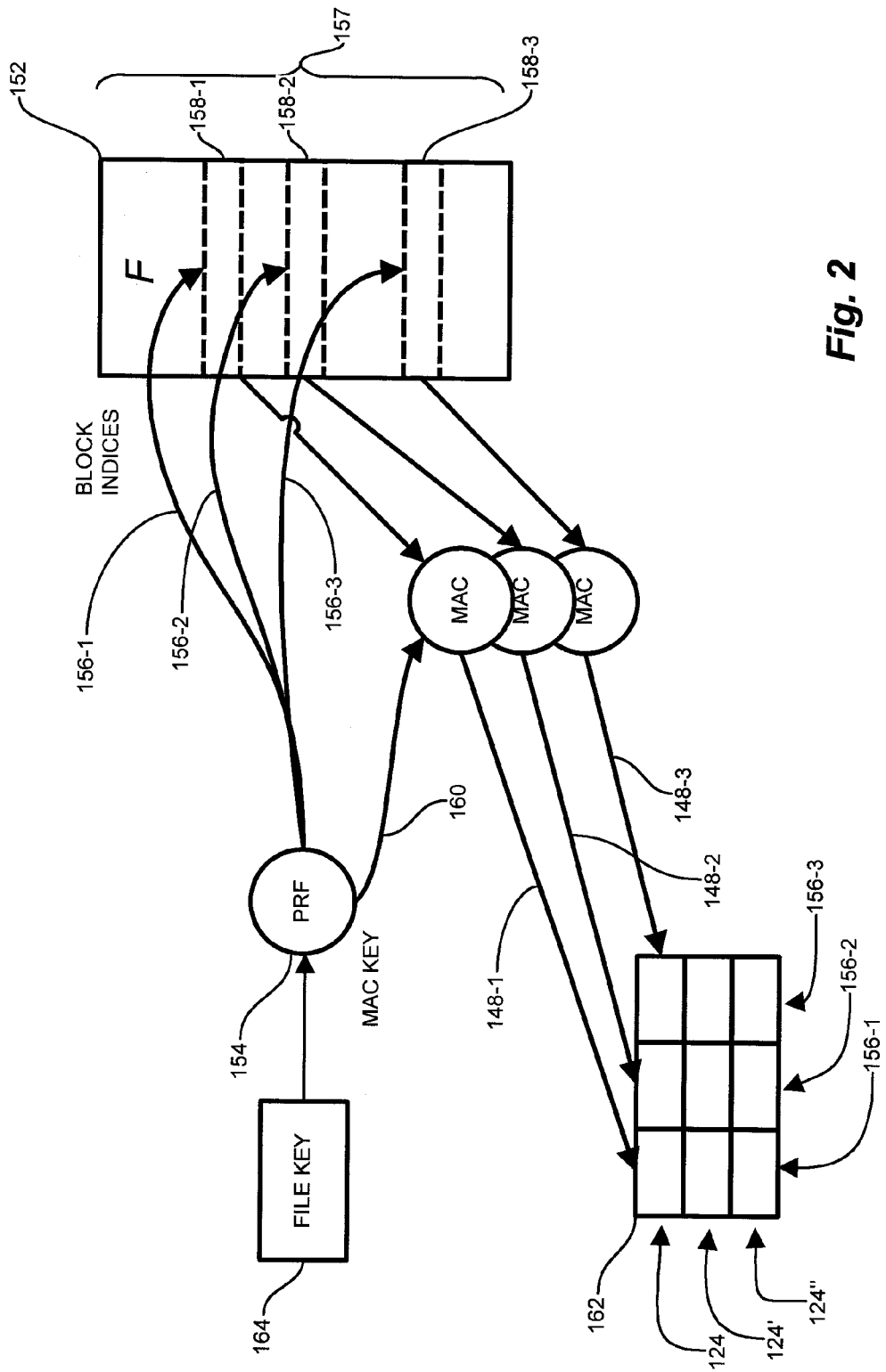
FIG. 2 shows a block diagram of information flow for a proof of retrievability exchange in the environment of FIG. 1.

FIG. 2 shows a block diagram of information flow for a proof of retrievability exchange in the environment of FIG. 1. Referring to FIGS. 1-2, the archive server 120 receives and stores an archived file 152 representing the client file 122. Since the purpose of proving retrievability demands that the archive server 120 not be able to guess or determine the validation value or values 148 expected as a response, the client 110 invokes a pseudorandom function 154 to generate block indices 156-1 . . . 156-3 (156 generally) pointing to a particular subset of file segments 157 as validation segments 158-1 . . . 158-3 (158 generally). The pseudorandom function (PRF) 154 also generates a MAC key 160 for generating the recoverability attributes 124 from the selected validation segments 158. Further, the client 110 employs a file key 164 for the PRF 154 employed for the block indices 156 and the MAC key 160 for each file 122. Both the client 110 and the server 120 have access to the PRF 154 for generating the indices 156 and recoverability attributes 124, but the client 110 retains the file key 164 until it issues a challenge 146, allowing the server 120 to compute but not anticipate the expected validation values 148 for comparison with the recoverability attributes 124 from which they were derived.

In the example of FIG. 2, the client 110 generates a MAC value as a validation attribute 148-1 . . . 148-3 for each validation segment 158 of the archived file 152. The client 110 stores the validation attributes 124 in a table 162 or other suitable mechanism, for subsequent challenge 146/response 149 exchanges, discussed further below. Also, in alternate arrangements, multiple recoverability segments 158-1 . . . 158-N may be included in computing a single validation attribute 124 (i.e. MAC). To accommodate successive challenge/response inquiries, the client 110 generates a plurality of recoverability attributes 124', 124", each from a different PRF 154. Therefore, the server 120 cannot anticipate the file segments 157 selected as validation segments 158 for successive challenges 146. The file key 162 therefore provides a functional interface for which the server 120 can deterministically compute the indices 156 and corresponding validation values 148, but cannot anticipate because the file key 164 is employed for the validation function.

The client 110 stores the recoverability attributes 124 and, upon successive challenges 146, issues the file key 162 corresponding to a particular set of validation values 124. The server 120 computes the block indices 156 to obtain the validation segments 158 based on the file key 162, and then computes the validation values 148 (i.e. MACs) based on the MAC key 160. If the server 120 has all the recoverability segments 158 for producing validation values 148 corresponding to the recoverability attributes 124 from which they were produced. The coverage of recoverability segments 158 deemed sufficient to assure file possession is based upon a threshold $\epsilon$ indicative of a maximum corruptible portion of the file that could evade detection, and encompasses iterative application of recoverability segment 158 selection, also discussed further below.

Figure 3:
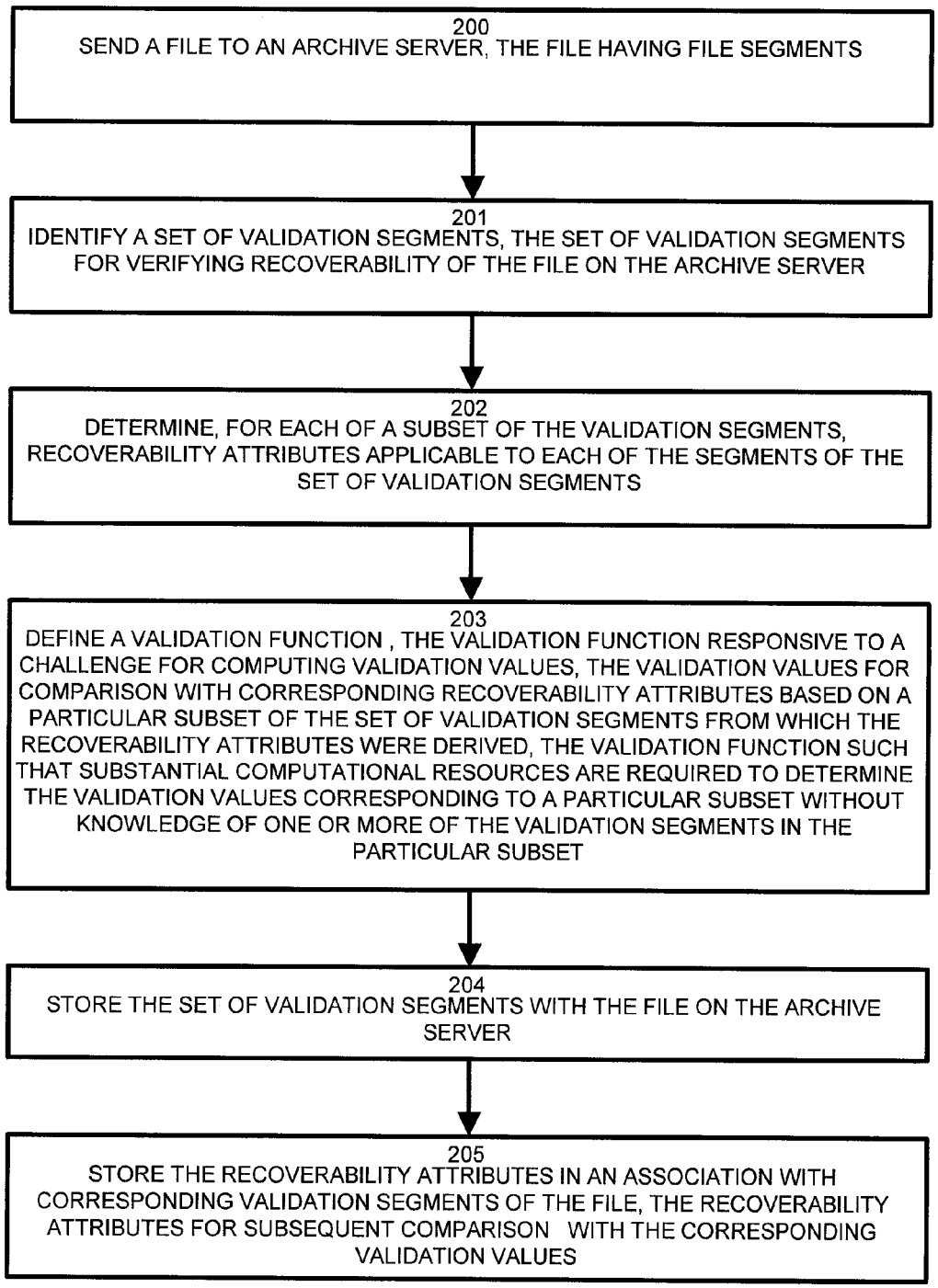
FIG. 3 shows a flowchart of proof of retrievability processing according to FIG. 2

FIG. 3 shows a flowchart of proof of retrievability processing according to FIG. 2. Referring to FIGS. 1-3, in a particular example configuration discussed herein, the method of storing a file for subsequent proof of recoverability includes, at step 200 sending a file 122 to an archive server 120, in which the file 122 has a plurality of file segments 157. A selection of file segments 157 is included in the validation segments 158 for which the recoverability attributes 124 are generated, and this selection may be further subdivided into subsets, or groups, of validation segments 158, also discussed further below. The client 110 identifies a set of validation segments 158-1 . . . 158-N, in which the set of validation segments 158 is for verifying recoverability of the file 122 on the archive server 120, as depicted at step 201. The client 110 determines, for each of a subset of the validation segments 158, recoverability attributes 124 applicable to each of the segments of the set of validation segments 158, as shown at step 202. The recoverability attributes 124 are typically generated by applying a one way function, such as the validation function 186 (FIG. 4) discussed below, however other approaches may be employed, such as generating sentinel values.

The client defines the validation function 186, such that the validation function 186 is responsive to a challenge 146 for computing the validation values 148, as depicted at step 203. The validation values 148 are for comparison with the corresponding recoverability attributes 124 based on a particular subset of the set of validation segments 158 from which the recoverability attributes 124 were derived. Typically, the validation function 186 is such that substantial computational resources are required to determine the validation values 148 corresponding to a particular subset, or group of recoverability segments 158 without knowledge of one or more of the validation segments 158 in the particular subset. A key or other mathematical operation is employed to compute both the location of the recoverability segments 158 and the corresponding validation values 148. Further, the validation function 186 may be the same that was used to compute the recoverability attributes 124 at the client 110, as when a symmetric key is used, or may be a different function, as when a public key scheme or sentinel values are employed.

The server 120 stores the set of validation segments 158 with the file 152 on the archive server 120, as shown at step 204, such that the recoverability segments 158 may be indexed or otherwise recovered from the archived file 152. The server 120 then stores the client 110 provided recoverability attributes 124 in an association with corresponding validation segments 158 of the file, such that the recoverability attributes 124 are operable for subsequent comparison, matching, or other operation with the corresponding validation values 148, as depicted at step 205. The recoverability attributes 124 may be stored on either the client 110 or the server 120, as long as the file key 164 and associated MAC keys 160 and segmentation keys 175 (used to compute indices 156 from the file key 164) remain unavailable to the server 120 until the client 110 issues a challenge 146.

Figure 4:
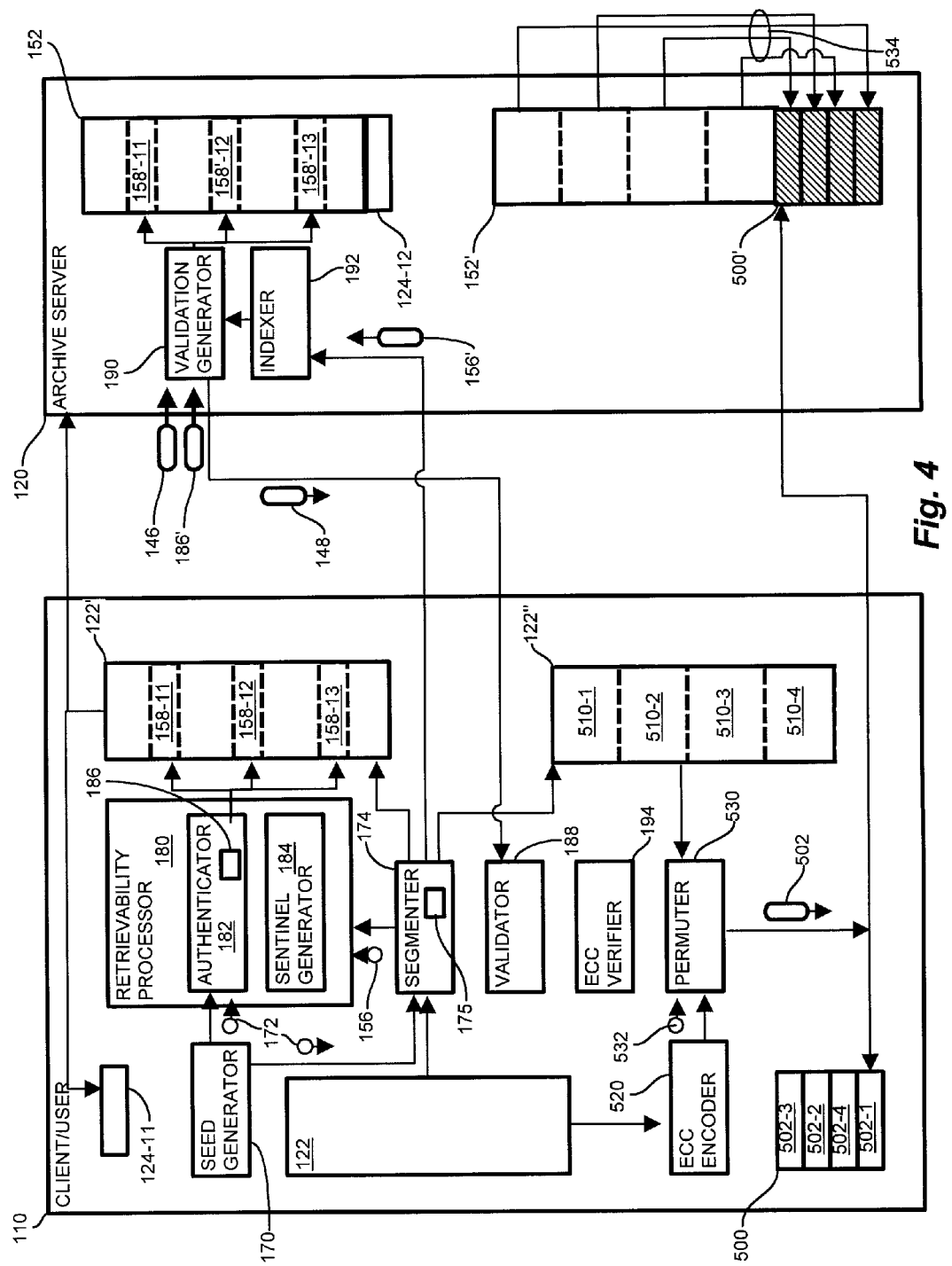
FIG. 4 shows a diagram of archive storage and retrievability in the environment of FIG. 1.
Figure 5:
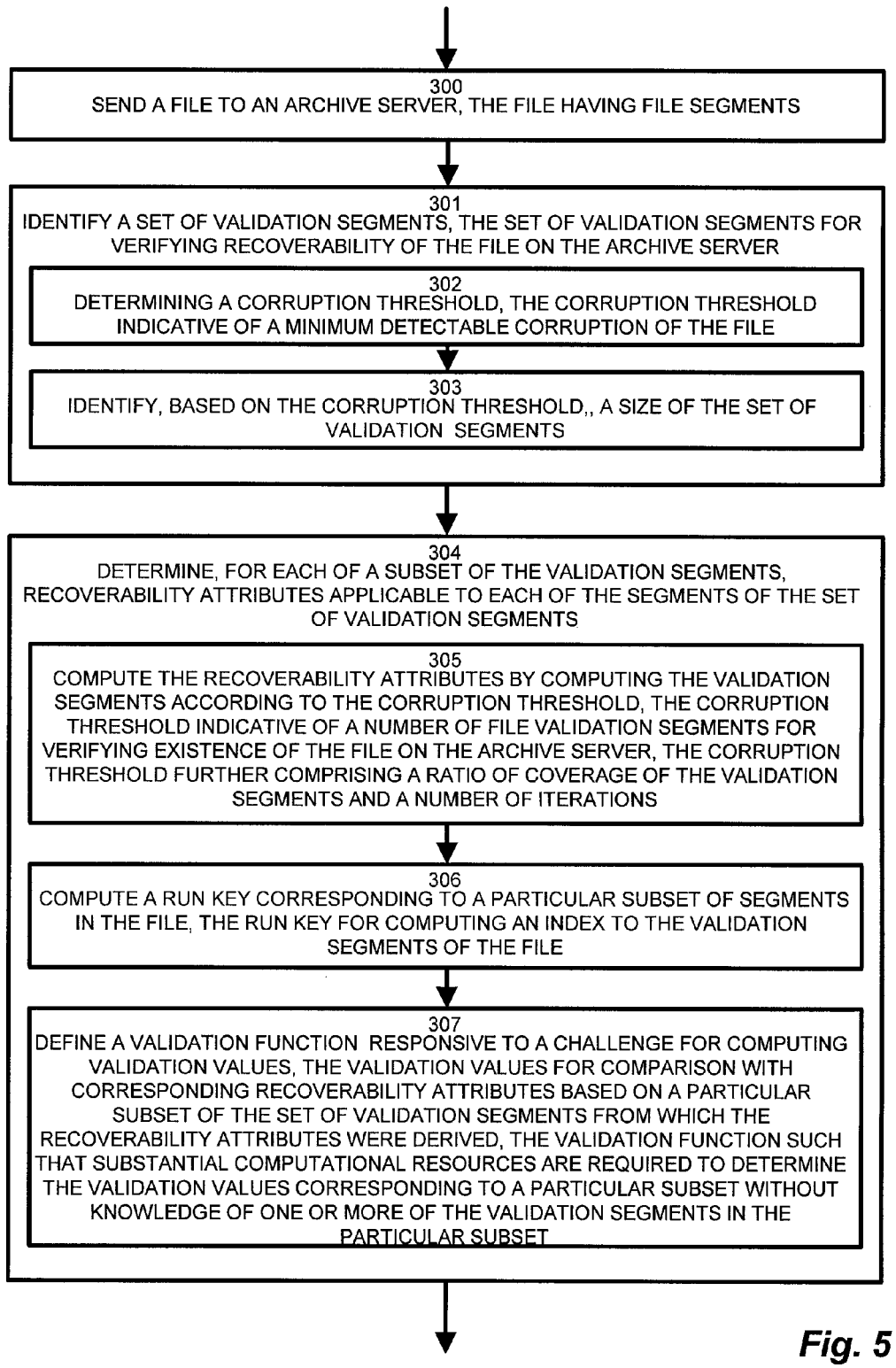
FIGS. 5-9 show a flowchart of archive storage and retrievability in the system of FIG. 4
Figure 6:
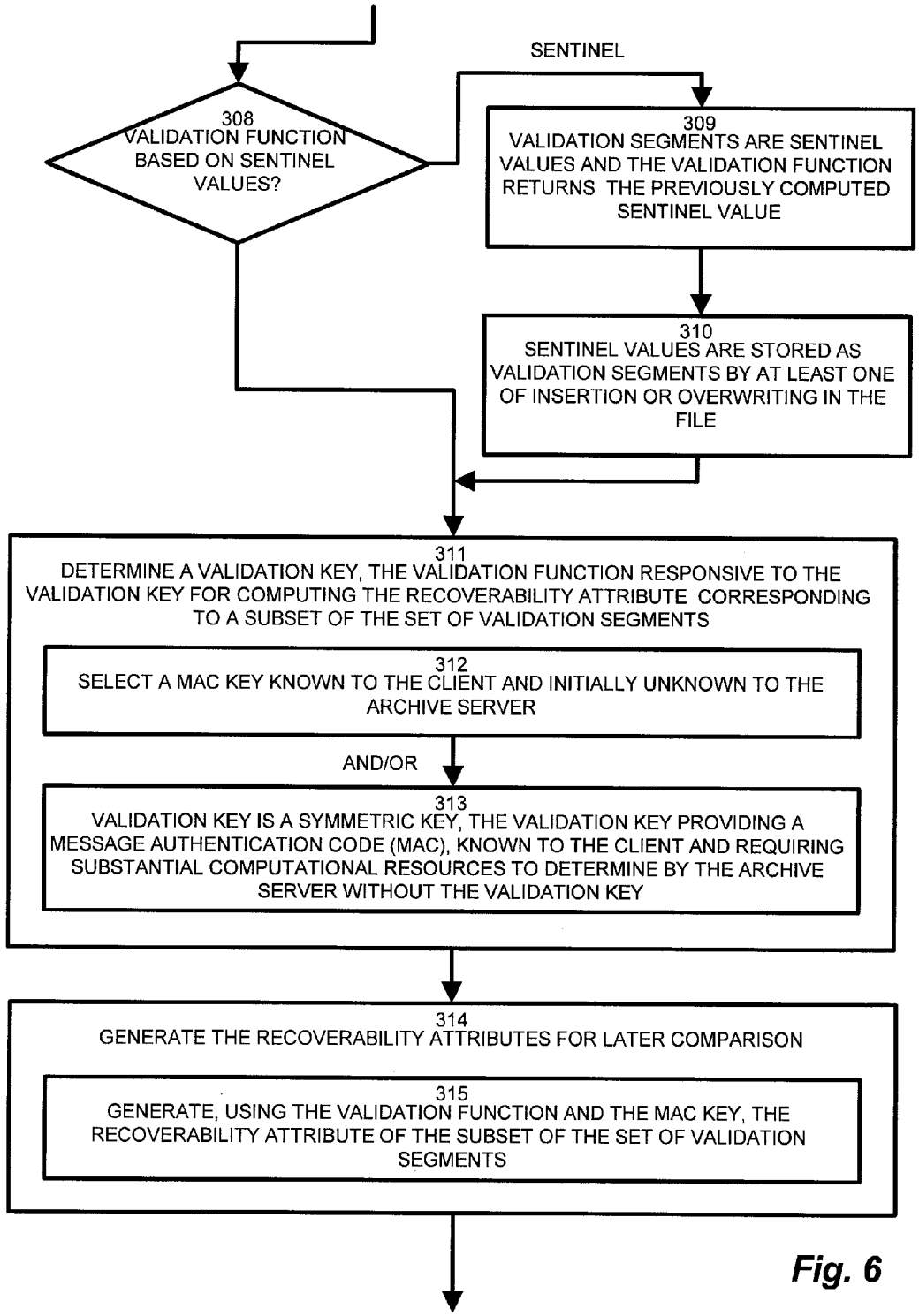
Figure 7:
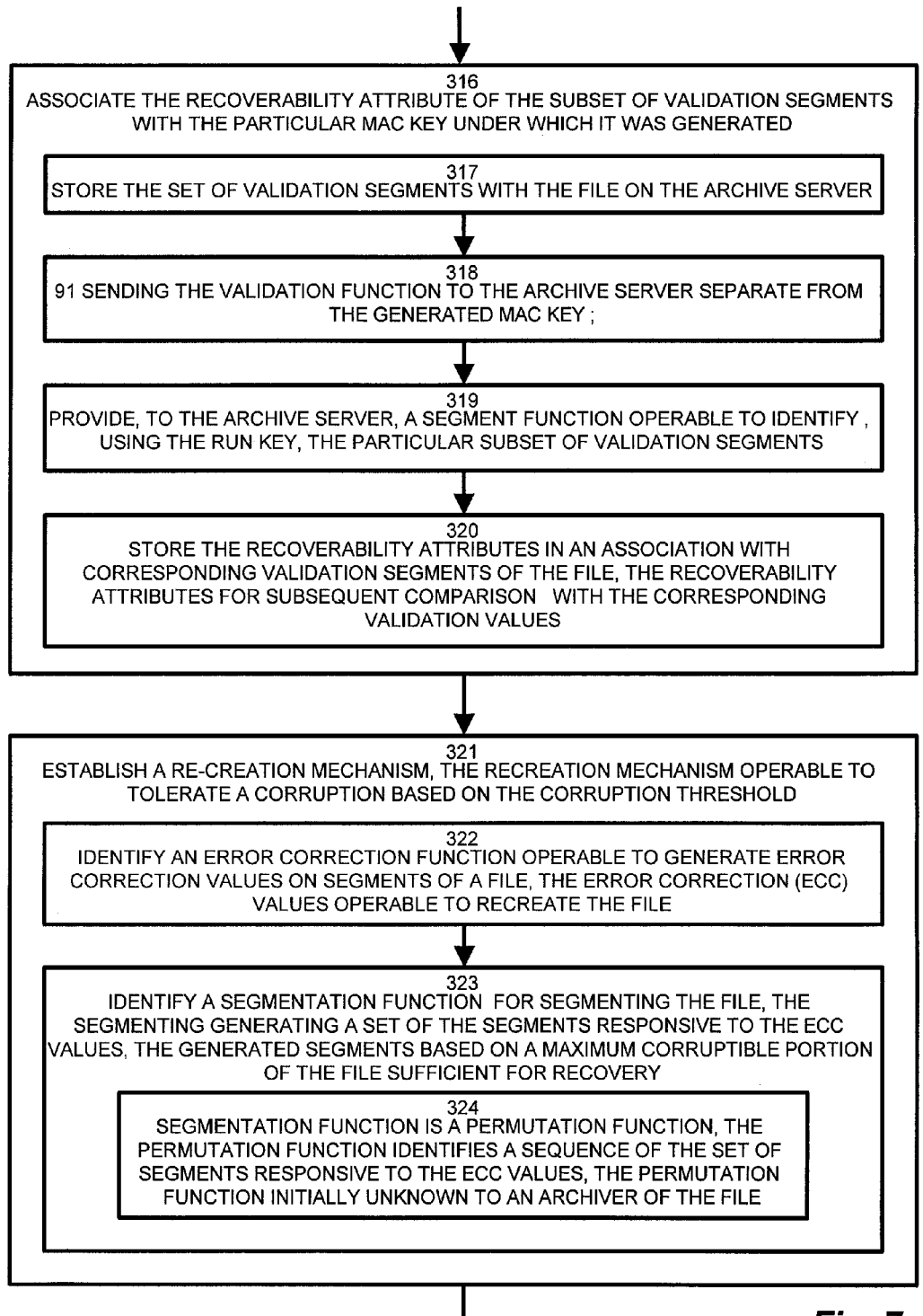
Figure 8:
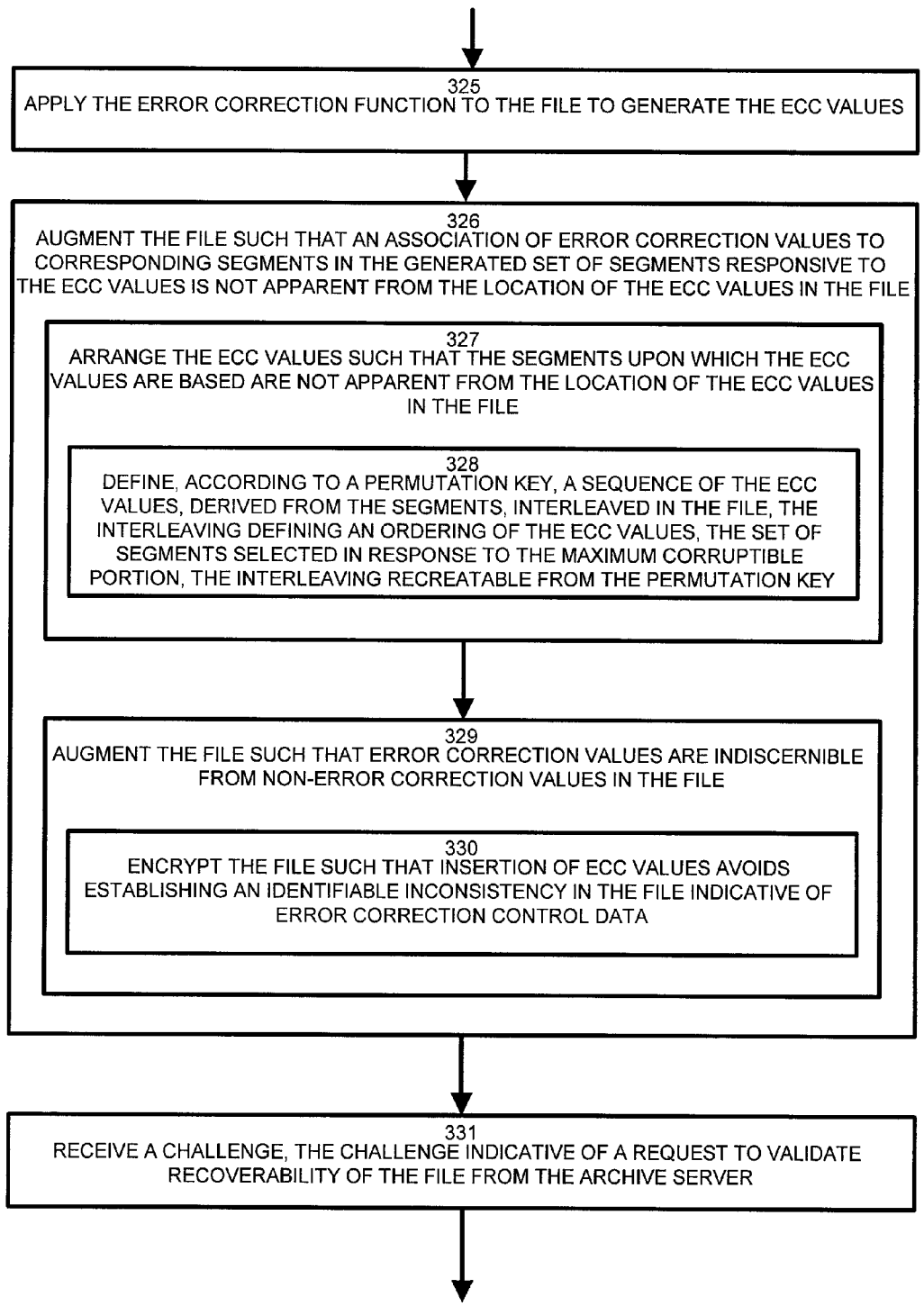
Figure 9:
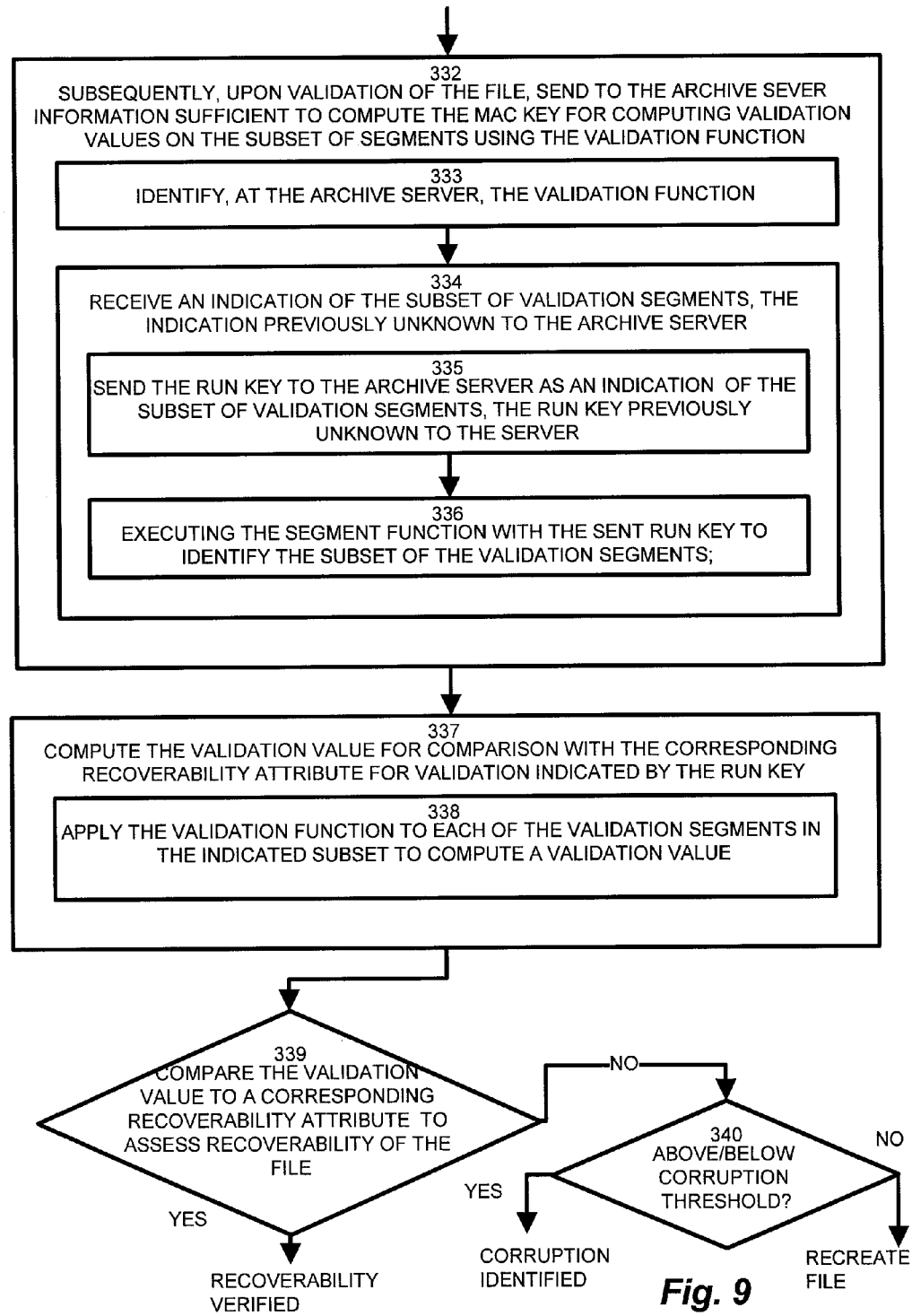

FIG. 4 shows a diagram of archive storage and retrievability in the environment of FIG. 1. Referring to FIGS. 1, 2 and 4, an alternate configuration is shown including error correction codes (ECC) for recovering files determined to be corrupted at the archive server 120. The combination of POR with ECC ensures that either corruption beyond the recoverability threshold $\epsilon$ is identified by the POR, or that corrupting within the recoverability threshold is recoverable via the ECCs. Further, conventional ECCs are typically focused on covering accidental erasure. They tend not to hold up well against an intentional adversary. Accordingly, configurations herein employ permutation and encryption on an ECC protected file, deterring a would-be intentional adversary from identifying ECC contents and corresponding non-ECC contents such that it is not apparent which portions (ECC contents) would foil subsequent ECC efforts.

The use of PORs complemented by ECCs is illustrated in the following examples: Suppose that the prover, on receiving an encoded file ~F, corrupts three randomly selected bits, B1, B2 and B3. These bits are unlikely to reside in either sentinels or validation segments, which constitute a small fraction of ~F. Thus, the verifier will probably not detect the corruption through POR execution. Thanks to the error-correction present in ~F, however, the verifier can recover the original file F completely intact.

Example 2. Suppose conversely that the prover corrupts many blocks in ~F, e.g., 20% of the file. In this case (absent very heavy error-coding), the verifier is unlikely to be able to recover the original file F. On the other hand, every sentinel that the verifier requests in a POR will detect the corruption with probability about ⅕. By requesting hundreds of sentinels, the verifier can detect the corruption with overwhelming probability.

In FIG. 4, an example configuration of an archiving client 110 and an archive server 120 are shown depicting a particular implementation of the features discussed above. A client 120 archives a file 122 with an archive server 120 employing POR and ECC protection as defined herein. A seed generator 170 generates a file key 172 for segmenting the file 122 and for generating recoverability attributes 124-11. A segmenter 174 employs the file key 172 to generate or map to a run key 175 for computing the indices 156 indicative of validation segments 158-11 . . . 158-13. A retrievability processor 180 receives the indices 156 for identifying the validation segments 158 in the segmented file 122'. An authenticator 182 employs the file key 172 to generate or lookup a MAC key 160 and computes recoverability attributes 124 using a validation function 186. Alternatively, the sentinel generator 184 is invoked to generate sentinel values as recoverability attributes 124. The sentinel values are inserted or overwritten in the archived file 152 as the recoverability segments 158'. Sentinel values avoid the need for a validation function 186, as the sentinel generator 184 produces the actual values expected to be returned upon a successive validation. In either case, the archived file 152 includes recoverability segments 158' that return values corresponding to the recoverability attributes 124-11.

The validation function 186, responsive to the MAC key 160, is also provided to a validation generator 190 at the archive server 120 as function 186'; in the case of a sentinel value the validation generator 190 simply returns the actual sentinel values 158'.

The recoverability attributes 124-11 include a value common to a group 158-11-158-13 of recoverability segments. A common recoverability attribute 124 value may be computed (i.e. MACed) for all recoverability segments 158 or otherwise grouped in a suitable manner. Further, the recoverability attributes 124-11 may be stored at the client 110 or appended/stored as recoverability attributes 124-12 at the server 120. Multiple recoverability attributes 124' may also be computed to allow successive PORs, such as quarterly or yearly, to be performed on the file 122.

In conjunction with the POR operations, an ECC encoder 520 generates ECC values 500 for subsequent recovery. The segmenter 174 identifies segments 510-1 . . . 510-4 (510 generally) for which to computer ECC values. The ECC encoder 520 generates ECC values 502-1 . . . 502-4 (502 generally) corresponding to the segments 510, but in an interleaved, or striping manner discussed further below. A permuter 530 receives a permutation key 532 from the seed generator 170 such that interleaving is defined by the permutation key 532. The permutation of the ECC values avoids correlation of ECC values 502 with the segments 510 in the file 122" to which they correspond without possession of the permutation key 532. As with the recoverability attributes 124, the ECC values 500 may also be stored at the server 120 as ECC values 500'. Further, the ECC encoder 520 may also encrypt either the ECC values alone or the entire file to prevent an identification of ECC and non-ECC information in the archived file 152'. In a particular arrangement, the archive stored ECC values 500' involves two permutations, one the reorders the file 122' implicitly to determine segments 510 and a second that reorders ECC values that are appended to the file. Alternatively, permutation may be applied to the whole file. It should be further noted that the ECC segmented file 152' and POR segmented file 152 are not stored twice at the server 120, being merely illustrated with the appropriate segmentation performed for POR operations and ECC operations.

Upon a POR request, the client 110 sends a challenge 146 including the run key 175 and the MAC key 160. An indexer 192 employs the run key 175 to compute the indices 156 indicative of the validation segments 158. The validation generator 190 employs the computed indices 156 to identify the validation segments 158, and invokes the MAC key 160 on the archived validation segments 158' to compute the validation values 148. A validator 188 at the client 110 receives the validation values 148, and compares and/or analyzes the values 148 against the recoverability attributes 124 computed when the file 122 was archived. Depending on the nature of the validation values 148, i.e. sentinel, MAC key, or other, various comparisons and/or matching may be involved in assessing the validity of the archived file 152. If the validator 188 determines that the archived file 152 is not intact, then the ECC verifier 194 retrieves the ECC codes 500 and attempts to recreate the file.

FIGS. 5-9 show a flowchart of archive storage and retrievability in the system of FIG. 4. Referring to FIGS. 4-9, a user/client 110 stores a file for subsequent proof of recoverability as disclosed herein by sending a file 120 to an archive server 120, such that the file 122 is arrangeable into file segments 157, as depicted at step 300. From the sent file 152 (either a local copy or just prior to sending the file), the client 110 identifies a set of validation segments 158, in which the set of validation segments 158 are those file segments 157 selected for verifying recoverability of the file 152 on the archive server 120, as shown at step 301. In the example arrangement, coupling POR processing with ECC mechanisms, identifying the set of validation segments 158 further includes determining a corruption threshold $\epsilon$, such that the corruption threshold is indicative of a minimum detectable corruption of the file 122, as depicted at step 302. The segmenter 174 identifies, based on the corruption threshold, a size of the set of validation segments 158, as depicted at step 303, such that corruption below the threshold is correctable via the ECC verifier 194.

The retrievability processor 180 determines, for each of a subset of the validation segments 158-N, recoverability attributes 124 applicable to each of the segments 158 of the set of validation segments 158-1 . . . 158-N, as depicted at step 304. As indicated above, individual recoverability attributes 124 may encompass multiple recoverability segments 158, such that each attribute value 124-N covers a group of segments 158, or even the entire archived file 152. The retrievability processor 180 computes the recoverability attributes 124 by computing the validation segments 158 according to the corruption threshold $\epsilon$, such that the corruption threshold is indicative of a number of file validation segments 158 for verifying existence of the file on the archive server 120, as disclosed at step 305. An increasing portion of file coverage by the validation segments 158 increases the likelihood of detecting even small quantums of corruption. For some files, even a single bit of corruption is substantially detrimental; however smaller deviations are more readily correctable via ECC operations, discussed further below. The corruption threshold therefore encompasses a ratio of coverage of the validation segments 158 and a number of iterations.

In the example arrangement which prevents false assurances of retrievability, computing the validation segments 158 of the file 122 further includes computing a run key 175 corresponding to a particular subset of segments in the file, such that the run key 175 is for computing an index 156 to the validation segments 158 of the file 152, as depicted at step 306. The retrievability processor 180 defines a validation function 186, such that the validation function 186 is responsive to a challenge 146 for computing the validation values 148, as shown at step 307. The server 120 computes the validation values 148 for comparison with the corresponding recoverability attributes 124 based on a particular subset of the set of validation segments 158 from which the recoverability attributes 124 were derived, in which the validation function 186 is such that substantial computational resources are required to determine the validation values 148 corresponding to a particular subset without knowledge of one or more of the validation segments 158 in the particular subset. In other words, it is computationally infeasible for the server 120 to falsely generate the expected recoverability attributes 124 because the server 120 cannot identify the recoverability function 186 or the file segments 157 for which to apply it to without the corresponding keys.

A check is performed, at step 308, to determine whether sentinel values are employed for the recoverability attributes 124. Sentinel values are external to the file, rather than computed from the file, and therefore can be simply compared upon retrieval rather than recomputed from the archived file. If sentinel values are employed, then the sentinel generator 184 generates the validation segments 158 for the archived file 152 as sentinel values and the validation function 186' for generating validation values 148 simply returns the previously computed sentinel value, as shown at step 309. In the case of sentinel values, the sentinel values are stored as validation segments 158 by either insertion or overwriting in the file 152, as depicted at step 310. Although an overwriting approach has the effect of obliterating some of the data in the file 158, the overwritten data is less than the corruption threshold such that it may be subsequently recreated via the ECC verifier 194.

Alternatively, at step 311, the authenticator 182 determines a validation key 160, such that the validation function 186 is responsive to the key 160 for computing the recoverability attribute 124 corresponding to a subset of the set of validation segments 158. In the example configuration, the validation key 186 is a message authentication code (MAC) key 160, in which the authenticator 182 selects a MAC key 160 known to the client and initially unknown to the archive server 120, as depicted at step 312. The validation key is a symmetric key, such that the validation key provides a message authentication code (MAC), known to the client and requiring substantial computational resources to determine by the archive server without the validation key, as shown at step 313. Alternatively, a variety of authentication and key generation schemes may be employed, such as a public/private key pair and/or other authentication mechanism such as MD4, MD5, and SHA, as is known in the art.

The authenticator 182 then generates the recoverability attributes 124 for later comparison, as disclosed at step 314, which includes generating, using the validation function 186 and the MAC key 160, the recoverability attribute 124 of the subset of the set of validation segments 158 determined from the run key 156, as shown at step 315.

The retrievability processor 180 associates the recoverability attributes 124 of the subset of validation segments 158 with the particular MAC key 160 under which it was generated, as depicted at step 316, so that subsequent validation (i.e. challenges) may be performed. This includes, at step 317, storing the set of validation segments 124-12 with the file 152 on the archive server 120. Alternatively, the validation segments 124-11 may be retained by the client, however since the validation segments 124 are unintelligible without the MAC key 160 and the validation function 186, the client 110 need only maintain the MAC key 160 in secrecy.

The retrievability processor 180 sends, or otherwise makes available, the validation function to the archive server 120 separate from the generated MAC key 160, as shown at step 318, thus enabling a functional interface to the server 120 invokable on demand via the MAC key 160. Similarly, the retrievability processor 180 provides, to the archive server 120, a segment function 156' operable to identify, using the run key 175, the particular subset of validation segments 158, as depicted at step 319. The run key 175, as with the MAC key 160, is retained until a challenge so that the particular file segments 157 sought as validation segments 158 cannot be anticipated by the archive server 120. The retrievability processor 180 then ensures storage of the recoverability attributes 124 in an association with corresponding validation segments 158 of the file 122, thus preserving the recoverability attributes 124 for subsequent comparison with the corresponding validation values 148 upon computation by the archive server 120, as disclosed at step 320.

As indicated above, the POR validation is coupled with an ECC mechanism to recover from smaller deviations in file integrity that may not be caught by the POR approach, thus enabling complete coverage of the true state of the archived file 152, i.e. that it is either recoverable or identified as irretrievably corrupted so that remedial measures may be pursued. Accordingly, the ECC encoder 520 at the client 110 establishes a re-creation mechanism, such that the recreation mechanism is operable to tolerate a corruption based on the corruption threshold, as depicted at step 321. The ECC encoder positions a file 122 for recovery by identifying an error correction function operable to generate error correction code values 500 on segments 510 of a file 122", such that the error correction code (ECC) values are operable to recreate the file 122, as disclosed at step 322. The ECC encoder 520 invokes the segmenter 174 to identify a segmentation function for segmenting the file 122", such that the segmenter generates a set of the segments 510-1 . . . 510-4 responsive to the ECC values 500, in which the generated segments 510 are based on a maximum corruptible portion of the file sufficient for recovery, as depicted at step 323. In the example shown, the segmentation function is a permutation function, such that the permutation function identifies a sequence of the set of segments 510 responsive to the ECC values, in which the permutation function is initially unknown to the archiver 120 of the file 152', as disclosed at step 324. The permutation function applies an interleaving, or striping order to the ECC values 500' such that the ordering of the segments 510 from which they were derived is not ascertainable from the ECC values 502.

The ECC encoder 520 applies the error correction function to the file 122" to generate the ECC values 500, as depicted at step 325, and stores the values 500 either at the client 110 or at the server 120 as augmented attributes 500'. Upon storage at the server 120, a permuter 530 augments the file such that an association of error correction values 502 to corresponding segments 510 in the generated set of segments responsive to the ECC values is not apparent from the location 534 of the ECC values 502 in the file 152', as shown at step 326. In the example arrangement, this includes arranging the ECC values 502 such that the segments 510 upon which the ECC values are based are not apparent from the location of the ECC values in the file 152', depicted at step 327. Arrangement includes, as shown at step 328, defining, according to a permutation key, a sequence 534 of the ECC values 510, derived from the segments 510, interleaved in the file 152', the interleaving defining an ordering of the ECC values 502, such that the set of segments 510 is selected in response to the maximum corruptible portion, and in which the interleaving is recreatable from the permutation key 532.

Depending on the types of data in the file, the nature or appearance of the ECC data may suggest it's identity as parity data, i.e. a text file will appear with unintelligible portions for the ECC values 500. Accordingly, augmenting the file includes augmenting such that error correction values are indiscernible from non-error correction values in the file, as shown at step 329. Thus, in the example arrangement, augmenting further comprises encrypting the file such that insertion of ECC values 500' avoids establishing an identifiable inconsistency in the file indicative of error correction control data, as depicted at step 330.

An archive service such as provided by server 120 may then endure indefinitely pending a retrieval request 142, and may in fact never be called upon to produce the file 122. In contrast, in the configurations herein, the client 110 may request a POR 146 at any time, and the approach outlined herein may be employed to pursue quarterly or yearly PORs as part of archive maintenance, for example. At a particular point in time, therefore, the server 120 receives a challenge 146 indicative of a request to validate recoverability of the file 152 from the archive server 120, as disclosed at step 331. At some time, presumably immediately prior to generating the POR for validation of the file, the retrievability processor 180 sends to the archive sever 120 information sufficient to compute the MAC key 160 for computing the validation values 148 on the subset of segments 158 using the validation function 186, as depicted at step 332. This includes identifying, at the archive server 120, the validation function 186', and receiving an indication of the subset of validation segments 158' of the server file 152, in which the indication (i.e. indices) was previously unknown to the archive server 120, as shown at step 334 In the example arrangement, these correspond to the MAC key 160, in conjunction with the authentication function 186', and the run key 156 for identifying the segments 158'. The retrievability processor 180 sends the run key 156 to the archive server 120 as an indication of the subset of validation segments 158, in which the run key is previously unknown to the server, as shown at step 335, and the indexer 192 executes the segment function with the sent run key 156 to identify the subset of the validation segments 158, depicted at step 336.

Using the indexer to identify the recoverability segments 158, the validation generator 190 employs the MAC key 160 to compute the validation values 148 for comparison with the corresponding recoverability attribute 124 for validation of segments 158 indicated by the run key 156, as shown at step 337. This includes applying the validation function 186 to each of the validation segments 158 in the indicated subset to compute the validation value 148, as depicted at step 338. The validator 188 compares the validation value 148 to the corresponding recoverability attribute 124 to assess recoverability of the file, as disclosed at step 339, and determine if proof of recoverability has been satisfied, or if corruption was detected. If the corruption was below the threshold $\epsilon$, then even if it was undetected, the file is recoverable via the ECC verifier 194, as depicted at step 340. If corruption above the threshold was detected, then it is known that other mechanisms, such as parallel archives, should be pursued. In either case, the true state of the file is detected within an interval of periodic POR checks, such as quarterly or yearly.

The specific operations surrounding the example POR approach disclosed above may be considered as follows. A POR system PORSYS comprises the six functions defined below. The function respond is the only one executed by the prover P. All others are executed by the verifier V. For a given verifier invocation in a POR system, it is intended that the set of verifier-executed functions share and implicitly modify some persistent state. In other words, 'a' represents the state of a given invocation of V; we assume a is initially null. We let 'p' denote the full collection of system parameters. The only parameter we explicitly require for our system and security definitions is a security parameter j. (In practice, as will be seen in our main scheme in section 3, it is convenient for p also to include parameters specifying the length, formatting, and encoding of files, as well as challenge/response sizes.) On any failure, e.g., an invalid input or processing failure, we assume that a function outputs the special symbol $\bot$.

Keygen[p]–>k: The function keygen generates a secret key 'k'. (In a generalization of our protocol to a public-key setting, 'k' may be a public/private key pair. Additionally, for purposes of provability and privilege separation, we may choose to decompose k into multiple keys.)

Encode(F; k, a)–>Fn, N: The function encode generates a file handle n that is unique to a given verifier invocation. The function also transforms F into an (enlarged) file Fn and outputs the pair (Fn, n). Where appropriate, for a given invocation of verifier V, we let Fn denote the (unique) file whose input to encode has yielded handle n. Where this value is not well defined, i.e., where no call by verifier V to encode has yielded handle n, we let Fn def=$\bot$.

Extract(n, k, a)[p]–>F: The function extract is an interactive one that governs the extraction by verifier V of a file from a prover P. In particular, extract determines a sequence of challenges that V sends to P, and processes the resulting responses. If successful, the function recovers and outputs F$\square$.

Challenge(n, k, a)[p]–>c. The function challenge takes secret key k and a handle and accompanying state as input, along with system parameters. The function outputs a challenge value c for the file n.

Respond(c, n)–>r. The function respond is used by the prover P to generate a response to a challenge c. Note that in a POR system, a challenge c may originate either with challenge or extract.

Verify((r, n); k, a)–>b: $\{0, 1\}$. The function verify determines whether r represents a valid response to challenge c. The challenge c does not constitute explicit input in our model; it is implied by n and the verifier state. The function outputs a '1' bit if verification succeeds, and '0' otherwise.

The adversary A consists of two parts, A("setup") and A("respond"). The component A("setup") may interact arbitrarily with the verifier; it may create files and cause the verifier to encode and extract them; it may also obtain challenges from the verifier. The purpose of A("setup") is to create an archive on a special file Fn*. This archive is embodied as the second component, A("respond"). It is with A("respond") that the verifier executes the POR and attempts to retrieve Fn*.

In the example model, an archive—whether honest or adversarial—performs only one function. It receives a challenge c and returns a response r. An honest archive returns the correct response for file ˜Fn; an adversary may or may not do so. This challenge/response mechanism serves both as the foundation for proving retrievability in a POR and as the interface by which the function extract recovers a file Fn. In the normal course of operation, extract submits a sequence of challenges c1, c2, c3 . . . to an archive, reconstructs ~Fn from the corresponding responses, and then decodes ~Fn to obtain the original file Fn.

In the security definition exemplified above, we regard A("respond") as a stateless entity. (That is, its state does not change after responding to a challenge, it has no "memory.") On any given challenge c, A("respond") returns the correct response with some probability; otherwise, it returns an incorrect response according to some fixed probability distribution. These probabilities may be different from challenge to challenge, but because of our assumption that A("respond") is stateless, the probabilities remain fixed for any given challenge value. Put another way, A("respond") may be viewed as a set of probability distributions over challenge values c.

The ECC configuration thus complements the POR as in the following example: The ECC encoder 520 uses a striped "scrambled" code in which the file is divided into stripes, each stripe is encoded with a standard (n, k, d) Reed-Solomon code and a pseudorandom permutation is applied to the resulting symbols, followed by encryption of permuted file blocks. The permutation and encryption secret keys are known only to the client 110. Alternative configurations employ a systematic adversarial error-correcting code, i.e., one in which the message blocks of F remain unchanged by error-correcting. A systematic code of this kind has considerable practical benefit. In the ordinary case when the server is honest and extraction is unnecessary, i.e., the vast majority of the time, the client 110 need not perform any permutation or decryption on the recovered file 122. To build a systematic adversarial error-correcting code, we apply code "scrambling" exclusively to parity blocks. Scrambling alone does not ensure a random adversarial channel, as a plaintext file reveals stripe boundary information to an adversary. To hide stripe boundaries from an adversary, i.e., to scramble F 122, we partition the file 122 into stripes by implicit application of a pseudorandom permutation. (We need not explicitly permute the file.) Our outer code outputs the file F untouched, followed by the "scrambled" parity blocks. To hide stripe boundaries, the parity blocks are then encrypted. More formally, our adversarial error-correcting code SA-ECC takes as input secret keys k1, k2 and k3, and a message M of size m blocks. It encodes via the following operations:

1. Permute M using PRP[m] with key k1, divide the permuted message into [m/k] stripes of consecutive k blocks each, and compute error-correcting information for each stripe using code ECCout.

2. The output codeword is M followed by permuted and encrypted error-correcting information. (The permutation of parity blocks is accomplished by PRP[m/k(n−k)] with secret key k2; encryption takes place under key k3.) To decode, SA-ECC reverses the order of the above operations.

Those skilled in the art should readily appreciate that the programs and methods for providing proof of retrievability as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for providing proof of retrievability has been particularly shown and described with references to embodiments thereof, it will be understood by those skilled in the art that various changes in form and details may be made therein without departing from the scope of the invention encompassed by the appended claims.

What is claimed is:

1. A method of storing a file for subsequent proof of recoverability, comprising:

sending a file to an archive server, the file having file segments;

identifying a set of validation segments from the file segments, the set of validation segments including one or more subsets of the set of validation segments for verifying recoverability of the file on the archive server;

determining, for each of the one or more subsets of the set of validation segments, recoverability attributes applicable to the subset of the set of validation segments;

defining a validation function, the validation function responsive to a challenge for computing validation values, the validation values for comparison with corresponding recoverability attributes based on a particular subset of the set of validation segments from which the recoverability attributes were derived, the validation function such that substantial computational resources are required to determine the validation values corresponding to a particular subset without knowledge of one or more of the validation segments in the particular subset;

storing the set of validation segments with the file on the archive server;

storing the recoverability attributes in an association with corresponding validation segments of the file, the recoverability attributes for subsequent comparison with the corresponding validation values; and receiving a challenge, the challenge indicative of a request to validate recoverability of the file from the archive server, further comprising:

identifying, at the archive server, the validation function;

determining, as a function of the received challenge, an indication of the subset of validation segments;

applying the validation function to each of the validation segments in the indicated subset to compute a validation value; and comparing the validation value to a corresponding recoverability attribute to assess recoverability of the file.

2. The method of claim 1 wherein defining the validation function comprises:

determining a validation key, the validation function responsive to the validation key for computing the recoverability attribute corresponding to a subset of the set of validation segments; and generating the recoverability attributes for later comparison with the validation values.

3. The method of claim 2 wherein the validation key includes a message authentication code (MAC) key, further comprising:

selecting a MAC key known to the client and initially unknown to the archive server;

generating, using the validation function and the MAC key, the recoverability attribute of the subset of the set of validation segments;

associating the recoverability attribute of the subset of validation segments with the particular MAC key under which it was generated; and subsequently, upon validation of the file, sending to the archive server information sufficient to compute the MAC key for computing validation values on the subset of segments using the validation function.

4. The method of claim 2 wherein the validation key is a symmetric key, the validation key providing a message authentication code (MAC), known to the client and requiring substantial computational resources to determine by the archive server without the validation key.

5. The method of claim 1 wherein the validation segments are sentinel values and the validation function returns the previously computed sentinel value wherein the sentinel values are stored as validation segments by at least one of insertion or overwriting in the file.

6. The method of claim 1 wherein the validation function yields output that differs from an input subset of validation segments employed for computing the validation values.

7. The method of claim 1 wherein identifying the set of validation segments comprises:

determining a corruption threshold, the corruption threshold indicative of a minimum detectable corruption of the file;

identifying, based on the corruption threshold, a size of the set of validation segments; and computing the recoverability attributes by computing the validation segments according to the corruption threshold, the corruption threshold indicative of a number of file validation segments for verifying existence of the file on the archive server, the corruption threshold further comprising a ratio of coverage of the validation segments and a number of iterations.

8. The method of claim 7 further comprising establishing a recreation mechanism, the recreation mechanism operable to tolerate a corruption based on the corruption threshold.

9. The method of claim 1 wherein computing the validation segments of the file comprises:

computing a run key corresponding to a particular subset of segments in the file, the run key for computing an index to the validation segments of the file;

providing, to the archive server, a segment function operable to identify, using the run key, the particular subset of validation segments;

sending the run key to the archive server as an indication of the subset of validation segments, the run key previously unknown to the server;

executing the segment function with the sent run key to identify the subset of the validation segments; and computing the validation value for comparison with the corresponding recoverability attribute for validation indicated by the run key.

10. A POR (proof of recoverability) processor, comprising:

a network interface for sending a file to an archive server, the file having file segments;

a segmenter for identifying a set of validation segments, the set of validation segments for verifying recoverability of the file on the archive server;

a retrievability processor for determining, for each of a subset of the validation segments, recoverability attributes applicable to each of the segments of the set of validation segments;

an authenticator in the retrievability processor for defining a validation function, the validation function responsive to a challenge for computing validation values, the validation values for comparison with corresponding recoverability attributes based on a particular subset of the set of validation segments from which the recoverability attributes were derived, the validation function such that substantial computational resources are required to determine the validation values corresponding to a particular subset without knowledge of one or more of the validation segments in the particular subset; and the interface further operable to store the set of validation segments with the file on the archive server, and for storing the recoverability attributes in an association with corresponding validation segments of the file, the recoverability attributes for subsequent comparison with the corresponding validation values;

the authenticator further operable to generate a challenge, the challenge indicative of a request to validate recoverability of the file from the archive server;

the challenge invoking a validation generator for identifying, at the archive server, the validation function;

further including a validator operable to receive an indication of the subset of validation segments, the indication previously unknown to the archive server, apply the validation function to each of the validation segments in the indicated subset to compute a validation value, and compare the validation value to a corresponding recoverability attribute to assess recoverability of the file.

11. The POR processor of claim 10 further comprising a seed generator, the seed generator for:

determining a validation key, the validation function responsive to the validation key for computing the recoverability attribute corresponding to a subset of the set of validation segments, the recoverability attributes for later comparison with the validation values.

12. The POR processor of claim 10 further comprising:

an ECC encoder for identifying an error correction function operable to generate error correction values on segments of a file, the error correction (ECC) values operable to recreate the file;

a segmenter for identifying a segmentation function for segmenting the file, the segmenting generating a set of the segments responsive to the ECC values, the generated segments based on a maximum corruptible portion of the file sufficient for recovery;

augmenting the file such that an association of error correction values to corresponding segments in the generated set of segments responsive to the ECC values is not apparent from the location of the ECC values in the file;

the ECC encoder further applying the error correction function to the file to generate the ECC values; and a segmenter for arranging the ECC values such that the segments upon which the ECC values are based are not apparent from the location of the ECC values in the file.

13. A computer program product having a non-transitory computer readable storage medium operable to store computer program logic embodied in computer program code encoded as a set of processor based instructions thereon for storing a file for subsequent proof of recoverability comprising:

computer program code for sending a file to an archive server, the file having file segments;

computer program code for identifying a set of validation segments, the set of validation segments for verifying recoverability of the file on the archive server;

computer program code for determining, for each of a subset of the validation segments, recoverability attributes applicable to each of the segments of the set of validation segments;

computer program code for defining a validation function, the validation function responsive to a challenge for computing validation values, the validation values for comparison with corresponding recoverability attributes based on a particular subset of the set of validation segments from which the recoverability attributes were derived, the validation function such that substantial computational resources are required to determine the validation values corresponding to a particular subset without knowledge of one or more of the validation segments in the particular subset;

computer program code for storing the set of validation segments with the file on the archive server;

computer program code for storing the recoverability attributes in an association with corresponding validation segments of the file, the recoverability attributes for subsequent comparison with the corresponding validation values;

computer program code for determining a corruption threshold, the corruption threshold indicative of a minimum detectable corruption of the file;

computer program code for identifying, based on the corruption threshold, a size of the set of validation segments; and computer program code for computing the recoverability attributes by computing the validation segments according to the corruption threshold, the corruption threshold indicative of a number of file validation segments for verifying existence of the file on the archive server, the corruption threshold further comprising a ratio of coverage of the validation segments and a number of iterations.

14. A method for file transformation, using a secret key, such that the transformed file contains at least one error-correcting codeword, a location of constituent blocks of at least one of said codewords being difficult to determine without knowledge of the secret key, applying the file transformation comprising:

subdividing a file into a plurality of file blocks;

assigning the subdivided file blocks to a plurality of sets using the secret key, each of the sets including at least one file block;

applying an error-correcting code (ECC) to the file blocks in at least one of the plurality of sets, said error-correcting code yielding a codeword that contains at least one more block than the original set, each of the at least one sets defining constituent blocks for the yielded codeword, the codeword for recreating the constituent blocks; and assigning a collection of positions in the file to the blocks of said codeword, the set of corresponding original subdivided file blocks for said collection being difficult to determine without knowledge of the secret key;

wherein each of the codewords includes message information and parity information, the message information defining the constituent file blocks and the parity information for verifying the message information.

15. The method of claim 14 wherein the secret key defines a permutation on a plurality of file blocks, the permutation defining the positions.

16. The method of claim 14 in which the secret key further defines an encryption function on at least one file block, further comprising encrypting the file block such that boundaries between the blocks are obscured.

17. The method of claim 14 wherein the collection of positions defines the location of each of the constituent blocks of a codeword.

18. The method of claim 14 wherein the codewords comprise message blocks and redundancy blocks, the redundancy blocks defined by the ECC for recreating the message blocks.

19. The method of claim 18 further comprising:

identifying the constituent blocks of each codeword by determining a unique, keyed subset of file blocks; and appending a parity block defined by the ECC code.

* * * * *